C. W. HUNT.
Counter-Shaft for Driving Machinery.

No. 197,472. Patented Nov. 27, 1877.

Witnesses.

Inventor.
Charles W. Hunt.

UNITED STATES PATENT OFFICE.

CHARLES W. HUNT, OF WEST NEW BRIGHTON, NEW YORK, ASSIGNOR TO FRANCES M. HUNT, OF SAME PLACE.

IMPROVEMENT IN COUNTER-SHAFTS FOR DRIVING MACHINERY.

Specification forming part of Letters Patent No. 197,472, dated November 27, 1877; application filed October 24, 1877.

*To all whom it may concern:*

Be it known that I, CHARLES W. HUNT, of West New Brighton, county of Richmond, and State of New York, have invented new and useful Improvements in Counter-Shafts for Driving Machinery, by which the speed may be varied at will by moving a lever of the counter-shaft.

Figure 1:
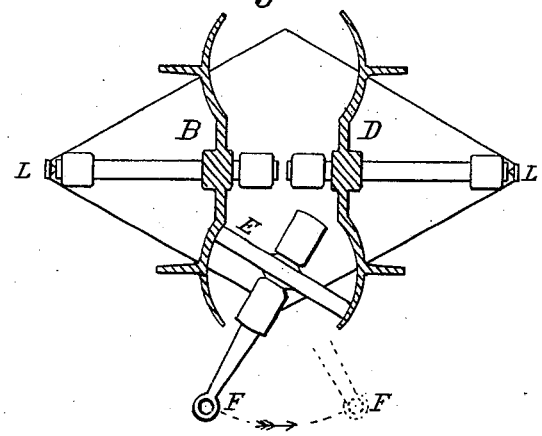
Figure 3:
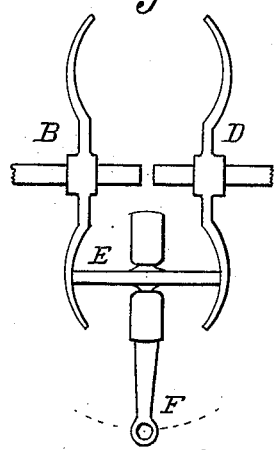
Figure 2:
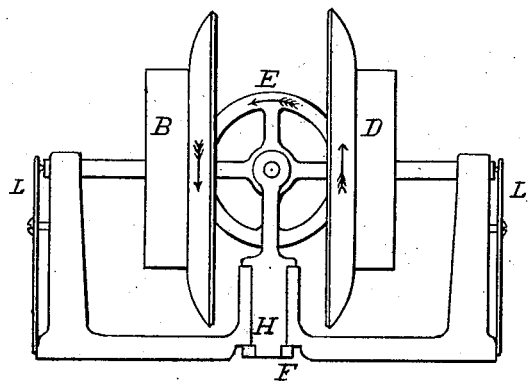
Figure 4:
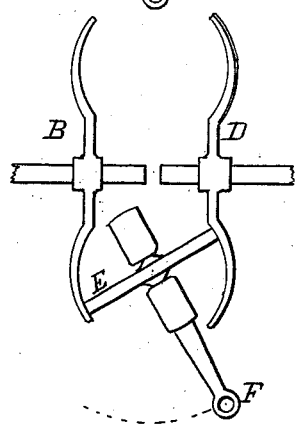

In the accompanying drawing, Figure 1 shows a plan with a portion in section. Fig. 2 shows a front elevation; Fig. 3, plan with the lever F and wheel E in a middle position; Fig. 4, plan with the lever F and wheel E in the opposite position from Fig. 1.

The operation is as follows: The wheel B is driven by a belt, or otherwise, from the main shafting. The edge of the wheel E bears against the side of the wheel B, and is driven by the friction of the surface in contact. The wheel D bears against the opposite side of the wheel E, and is driven by the friction, but in an opposite direction from the wheel B. The frame of the wheel E is pivoted to the base of the counter-shaft, between the faces of the wheels B and D. From the frame H of the wheel E a lever, F, projects, by means of which the wheel E is vibrated, so as to bring one edge of the wheel E to a smaller diameter of the wheel B and to the larger diameter of the wheel D, the wheel D then making a less number of revolutions than the wheel B. When the lever F is moved to the opposite position the wheel E then bears against the large diameter of B and the small diameter of D, the wheel D then making a greater number of revolutions than the driving-wheel B. The faces of the wheels B and D are shaped like a portion of a spherical ring where the wheel E bears against them, the radius for forming the face of the wheels B and D being equal to the distance of the edge of the wheel E from the axis H, upon which it vibrates. When the center H is directly under the center of the wheel E the spherical portions of the wheels B and D are equal; when the center of vibration H is not under the center of E the wheels B and D are unequal.

To press the wheels B and D against E, to obtain the necessary friction, springs L L are placed at each end of the shafts of B and D. These can be adjusted to bear with any required force.

It will be evident that the wheels need not necessarily be shaped as shown in the drawing, but could be flat disks. The effect of the vibration of the wheel E would be the same, but the springs would have to be more flexible to permit the end motion of the shaft.

What I claim as my invention is—

1. The vibrating wheel E, between two opposite disks, B and D, substantially as described.

2. The wheels B and D, having their faces shaped like a spherical ring, substantially as described, in combination with the vibrating friction-wheel E.

CHARLES W. HUNT.

Witnesses:
J. W. ANDREAS,
DAVID B. DUNCAN.